US010755176B2

(12) United States Patent
Langley et al.

(10) Patent No.: US 10,755,176 B2
(45) Date of Patent: Aug. 25, 2020

(54) METHODS AND SYSTEMS FOR TROUBLESHOOTING PROBLEMS IN COMPLEX SYSTEMS USING MULTIPLE KNOWLEDGEBASES

(71) Applicant: Casebank Technologies Inc., Mississauga (CA)

(72) Inventors: Alan Mark Langley, Mississauga (CA); Phillip Andrew D'Eon, Caledon (CA); Matija Han, North York (CA); Evgeny Fraimovich, Thornhill (CA)

(73) Assignee: Casebank Technologies Inc., Mississauga, Ontario (CA)

( * ) Notice: Subject to any disclaimer, the term of this patent is extended or adjusted under 35 U.S.C. 154(b) by 650 days.

(21) Appl. No.: 14/782,903

(22) PCT Filed: Mar. 27, 2015

(86) PCT No.: PCT/CA2015/000188
§ 371 (c)(1),
(2) Date: Oct. 7, 2015

(87) PCT Pub. No.: WO2015/143545
PCT Pub. Date: Oct. 1, 2015

(65) Prior Publication Data
US 2017/0017881 A1 Jan. 19, 2017

Related U.S. Application Data

(60) Provisional application No. 61/971,722, filed on Mar. 28, 2014.

(51) Int. Cl.
*G06N 5/02* (2006.01)
*G06N 5/04* (2006.01)
(Continued)

(52) U.S. Cl.
CPC ............... *G06N 5/02* (2013.01); *B64F 5/00* (2013.01); *G06N 5/04* (2013.01); *G06Q 10/0633* (2013.01)

(58) Field of Classification Search
CPC ........ G06N 5/02; G06N 5/04; G06Q 10/0633; B64F 5/00
See application file for complete search history.

(56) References Cited

U.S. PATENT DOCUMENTS 5,822,743 A * 10/1998 Gupta ................ G06N 5/04
706/50
6,026,393 A * 2/2000 Gupta ................ G06F 11/2257
(Continued)

FOREIGN PATENT DOCUMENTS

CN 101388085 3/2009

OTHER PUBLICATIONS

Case-Based Troubleshooting Knowledge Management.*
(Continued)

*Primary Examiner* — Kakali Chaki
*Assistant Examiner* — Ababacar Seck
(74) *Attorney, Agent, or Firm* — Bereskin & Parr LLP (57) ABSTRACT

A system and method for troubleshooting problems in complex systems using multiple knowledgebases comprises a first knowledgebase that has a case-based reasoning engine and knowledge from which a first set of possible solutions can be determined, and a second knowledgebase that has a case-based reasoning engine and knowledge from which a second set of possible solutions can be determined. The first knowledgebase pertains to a first equipment, and the second knowledgebase pertains to a second equipment. The second equipment is a component of the first equipment. A Federa-
(Continued)

tion Manager associated with the first knowledgebase transfers a case-based reasoning session between the first and second knowledgebases.

30 Claims, 7 Drawing Sheets

(51) Int. Cl.
  *B64F 5/00* (2017.01)
  *G06Q 10/06* (2012.01)

(56) References Cited

U.S. PATENT DOCUMENTS

| | | | |
|---|---|---|---|
| 6,728,692 B1 | 4/2004 | Martinka et al. | |
| 7,225,176 B2* | 5/2007 | Atamer | G06F 17/3053 706/45 |
| 2004/0044542 A1* | 3/2004 | Beniaminy | G06N 5/022 706/45 |
| 2008/0162498 A1 | 7/2008 | Omoigui | |
| 2008/0294423 A1* | 11/2008 | Castellani | G06F 11/0733 704/4 |
| 2009/0106224 A1* | 4/2009 | Roulland | G06F 17/30646 |
| 2010/0071056 A1 | 3/2010 | Cheng et al. | |
| 2011/0314014 A1 | 12/2011 | Junginger et al. | |
| 2012/0216267 A1* | 8/2012 | Austel | H04L 9/3234 726/8 |
| 2014/0154648 A1* | 6/2014 | Gonsalves | G06Q 10/10 434/219 |

OTHER PUBLICATIONS

The Case for Case-Based Transfer Learning.*
Canadian Intellectual Property Office, Office Action for Canadian Patent Application No. 2,909,413, dated Jul. 23, 2018.
International Searching Authority, International Search Report and Written opinion dated Jul. 8, 2015, PCT Application Serial No. PCT/CA2015/000188.

* cited by examiner

METHODS AND SYSTEMS FOR TROUBLESHOOTING PROBLEMS IN COMPLEX SYSTEMS USING MULTIPLE KNOWLEDGEBASES

PRIORITY CLAIM

This application claims the benefit of U.S. Provisional Patent Application Ser. No. 61/971,722 filed on 28 Mar. 2014 by the present inventor(s), and entitled "Methods and Systems for Troubleshooting Problems in Complex Systems Using Multiple Knowledgebases", the entire contents of which are hereby incorporated by reference herein for all purposes.

FIELD OF THE INVENTION

The embodiments herein relate to methods and systems for troubleshooting problems in complex systems.

BACKGROUND

Companies that manufacture and support their own products tend to have the deepest and broadest expertise on those products. Often, individual manufacturers will maintain a repository of their own knowledge, and make such knowledge available to their customers to assist them in troubleshooting problems with their products. In some cases, this knowledge can be stored, in the form of case data in a solved case database, known as a knowledgebase, which can then be used by a computerized troubleshooting system such as the SpotLight® case-based reasoning system provided by the applicant, to troubleshoot the problems.

In some cases, however, a troubleshooter may face a dilemma. For example, when the products from several manufacturers are combined, such as an engine on an aircraft. A problem could relate to a product from one of several manufacturers. In such a case, the technician may not know whether to go to the aircraft manufacturer or the engine manufacturer for the best troubleshooting guidance.

Similarly, the manufacturers may also face a dilemma. They may not know whether they should copy, convert, and update their supplier's troubleshooting guidance for the life of the product, or direct their customers to the supplier for troubleshooting guidance when necessary. If the manufacturers do the latter, they may lose feedback from their valued customers, which is a concern.

There is accordingly a need for improved methods and systems for troubleshooting problems in aircraft systems, and in other complex systems, which address these concerns.

SUMMARY

According to one aspect, there is provided a system for troubleshooting problems in complex equipment using multiple knowledgebases. The system comprises a first knowledgebase and a second knowledgebase. The first knowledgebase comprises a first set of knowledge, and a first case-based reasoning engine for determining a first set of possible solutions. The first knowledge pertains to a first equipment. The second knowledgebase comprises a second set of knowledge, and a second case-based reasoning engine for determining a second set of possible solutions. The second set of knowledge pertains to a second equipment that is a component of the first equipment. The system further comprises a federation manager associated with the first knowledgebase for transferring a case-based reasoning session between the first and second knowledgebases.

According to some embodiments, the first knowledgebase is configured to address queries of a regular attribute and a border attribute, the border attribute being associated with attributes of the second knowledgebase.

According to some embodiments, the system further comprises a session passport, and the federation manager is configured to implement a passport protocol in association with the session passport.

According to some embodiments, the federation manager is further configured to delegate the second case-based reasoning engine to search for the solution in the second knowledgebase when the border attribute is being queried.

According to some embodiments, the Federation Manager is configured to transfer the case-based reasoning session from the first knowledgebase to the second knowledgebase using the passport protocol in association with the session passport. This is accomplished by packing the session information and storing it in the session passport, and suspending the case-based reasoning session on the first knowledgebase. The session passport is then transmitted to the second knowledgebase from the first knowledgebase, and a new case-based reasoning session is initiated on the second knowledgebase. Subsequently, the session information is unpacked from the session passport, and is applied to the new case-based reasoning session on the second knowledgebase.

According to some embodiments, the Federation Manager is configured to transfer the new case-based reasoning session and a solution from the second knowledgebase to the first knowledgebase using the passport protocol in association with the session passport. This is accomplished by receiving the solution from the second set of possible solutions, the solution being determined by the second case-based reasoning engine, and then packing information pertaining to the new case-based reasoning session and the solution and storing it in the session passport. Then, the session passport is transmitted from the second knowledgebase to the first knowledgebase. The case-based reasoning session on the first knowledgebase is then resumed. The information pertaining to the new case-based reasoning session and the solution from the session passport are then unpacked and applied to the case-based reasoning session on the first knowledgebase.

According to some embodiments, the first knowledgebase is configured to operate in a regular mode, and the second knowledgebase is configured to operate in a subcomponent session mode.

According to another aspect, there is provided a method for troubleshooting problems in complex equipment using multiple knowledgebases. The method starts by initiating a session on a first knowledgebase system, for finding a solution associated with a symptom using the case-based reasoning of the knowledgebase. The method then searches the first knowledgebase system for the solution, and, during this search, identifies a second knowledgebase system that is relevant to the symptom. After identifying the second knowledgebase, the method transfers the session from the first knowledgebase system to the second knowledgebase system, and searches the second knowledgebase system for the solution. The search concludes when one of three events occurs. First, the solution may be found on the second knowledgebase system. Second, the fact that the solution is not found on the second knowledgebase system may be identified, and the session may be transferred to the first knowledgebase system. Third, the fact that the solution is not found on the second knowledgebase system may be identified, and a third knowledgebase system may be identified to which the session can be sent.

According to some embodiments, the method further comprises the step of transferring the session from the second knowledgebase system to the first knowledgebase system. Prior to each of the session transfers, sensitive information is removed from session information, for preventing the disclosure of sensitive information from one of the knowledgebase systems to the other knowledgebase system.

According to some embodiments, the method further comprises the step of translating a term or structure of the second knowledgebase system to a corresponding term or structure of the first knowledgebase system prior to the transferring of the session.

According to some embodiments, the method further comprises the step of transferring the information pertaining to the solution from the second knowledgebase system to the first knowledgebase system if the solution is found on the second knowledgebase.

According to some embodiments, the method further comprises using the case-based reasoning on the first knowledgebase system in order to search for the solution if the solution has not been found on the second knowledgebase system and the session has been transferred to the first knowledgebase system.

According to some embodiments, the step of identifying the second knowledgebase system is based on identifying a component of the complex equipment that may be associated with the system.

According to some embodiments, the step of transferring the session comprises storing session information pertaining to the first knowledgebase into a session passport and importing the session information from the session passport into a new session on the second knowledgebase.

According to some embodiments, the method further comprises the step of suspending the session on the first knowledgebase system prior to the step of transferring the session to the second knowledgebase system, and then resuming the session on the first knowledgebase system after the step of transferring the session and information pertaining to the solution from the second knowledgebase system to the first knowledgebase system.

According to some embodiments, the step of transferring the session comprises the preliminary step of prompting a user to choose to transfer the session to the second knowledgebase.

According to some embodiments, the step of transferring the session comprises automatically transferring the session without a user choosing to transfer the session to the second knowledgebase.

According to some embodiments, the method further comprises the preliminary step of searching for an initial symptom across a plurality of connected knowledgebases to determine which of the plurality of knowledgebases should be the first knowledgebase.

BRIEF DESCRIPTION OF THE DRAWINGS

Some embodiments of the present specification will now be described, by way of example only, with reference to the following drawings, in which.

DETAILED DESCRIPTION

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

In some cases, the embodiments of the systems and methods described herein may be implemented in hardware or software, or a combination of both.

In some cases, embodiments may be implemented in one or more computer programs executing on one or more programmable computing devices including at least one processor, a data storage device (including in some cases volatile and non-volatile memory and/or data storage elements), at least one input device, and at least one output device.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

Complex systems may consist of multiple subsystems. In the case of equipment, specific knowledge is often provided by a different manufacturer. For example, an aircraft is composed of complex sub-systems such as engines, avionics, landing gear, flight control systems, and many others. The vendors of those subsystems provide similar versions of their equipment to the makers of other aircraft, which means that potentially relevant troubleshooting experience may exist quite apart from their direct experience on this aircraft type.

Each subsystem vendor is a specialist in its own products, and therefore often possesses not only deep knowledge for troubleshooting its own products, but also broad knowledge of its products in similar applications.

Companies or divisions that supply such complex subsystems operate independently of the primary equipment manufacturer, and they need to maintain their own troubleshooting knowledgebases, for their own product support purposes.

Furthermore, they need to do this independently of their many customers, because each customer will have some unique needs.

As a result, the best available troubleshooting knowledge resides in multiple locations between the equipment OEM and the many sub-system vendor troubleshooting support tools. The dispersed nature of that knowledge makes it difficult for a technician to find the best available guidance in a single tool when troubleshooting a major assembly—an aircraft, for instance.

Knowledgebase federation solves this dilemma by enabling the different parties to develop their own knowledgebases largely independently of each other, much along the lines that the equipment itself is manufactured and configured, with a relatively small amount of interface coordination between the two parties.

The concept of federated knowledgebases involves at least two knowledgebases—typically one knowledgebase for the major assembly, e.g., an aircraft, and one (or more) for a "subcomponent" knowledgebase, e.g., the jet engine.

Subcomponent knowledgebases may in turn also be connected to sub-subcomponent knowledgebases. For example, the aircraft knowledgebase may be federated with a jet engine knowledgebase, which may be federated with the thrust reverser vendor's knowledgebase, and perhaps with a knowledgebase from the engine controls division of the same company.

Federation technology for knowledge-based information retrieval systems using case-based reasoning, such as the SpotLight® system, provided by the applicant, allows a single troubleshooting session to move across multiple knowledgebases during troubleshooting, even if those are owned and operated by different companies.

In order to achieve knowledgebase federation using case-based reasoning systems, certain changes, adaptations, and improvements are made to the case-based reasoning system. These include providing a Federation Manager, a Session Passport, and a Passport Protocol. Furthermore, a new type of attribute of the assembly or subcomponent used by the knowledgebase is defined, as well as a new operating mode for the knowledgebase. The new type of attribute will be referred to here as a "border attribute" (distinct from a "regular" attribute that is used by a stand-alone or "non-federated" knowledgebase). The new operating mode will be referred to here as a "subcomponent session mode".

The term "Federation Manager" refers to a central component of a system for troubleshooting problems in complex system using multiple knowledgebases, that orchestrates session handoff between multiple instances of a case-based reasoning server. According to some embodiments, the Federation Manager is a part of the case-based reasoning server, whose main tasks are session hand-off and session hand-back coordination.

The term "Session Passport" refers to data, or a non-transitory computer-readable medium for storing data comprising a collection of all relevant data pertaining to knowledgebases through which a session has already travelled (i.e. been transferred), as well as relevant user actions and inputs that might affect further troubleshooting. This information may be generally referred to as session information. According to some embodiments, a Session Passport may also store information pertaining to a solution or root cause associated with a symptom, problem, or attribute. The information stored in the Session Passport is written, read, and used by the Federation Manager.

The term "Passport Protocol" refers to a collection of procedures that can be specifically tailored for each pair of federated knowledgebases, for performing the tasks related to the Session Passport and the transferring of a session. The Passport Protocol may define the procedures for packing relevant session information into a serializable format and storing it in the Session Passport prior to session handoff, and unpacking the Session Passport just after the handoff. The Passport Protocol may also define the procedures for applying the session information from the Session Passport to the new session record in order to set initial observations, event details, etc. Similarly, the Passport Protocol may define the procedures for packing relevant solution information into the Session Passport prior to session hand-back, and unpacking this information from the Session Passport after the hand-back has occurred. Subsequently, application of the session information and the solution information to the suspended session record in the originating knowledgebase, in order to set the observation for a border attributes and other attributes may be accomplished according to the procedures defined by the Passport Protocol.

According to some embodiments, the Passport Protocol will typically consist of two components. One component is used at the side of the originating knowledgebase for the session, and one component is used at the side of the destination knowledgebase. The components may be referred to as a "source protocol" and a "destination protocol".

According to some embodiments, the Passport Protocol may include procedures for inter-knowledgebase translation. For example, it is possible that two knowledgebases may be federated, when each of the knowledgebases have been authored independently. In such a case, the terminology and structure may have been implemented with inconsistencies between the two knowledgebases. This can be overcome with the translation procedures of the Passport Protocol, which identify the terms and structures of one federated knowledgebase and associate them with the terms and structures of the other federated knowledgebase.

The term "border attribute" refers to a new type of attribute that is specifically relevant to the session hand-off and hand-back procedures. A border attribute is similar to a regular attribute (i.e. an attribute used by a stand-alone or non-federated knowledgebase). However, with a border attribute, the user (such as a field technician) does not explicitly provide the value for the attribute. Rather, the value is set as a result of troubleshooting a subcomponent knowledgebase. Also, border attributes are gateways through which subcomponent solutions can be drawn in and displayed from top-level or other subcomponent knowledgebases that utilize them.

A border attribute is a special kind of case-based-reasoning attribute that allows a session to travel from one knowledgebase to another. It represents a joining point between the subject matter (domains) of two federated knowledgebases. Each border attribute is essentially a high-level problem symptom with a pointer to a federated knowledgebase that might help with that symptom.

A user cannot directly answer a border attribute. Rather, when clicked, a border attribute hands off the session to the target knowledgebase.

Border attributes are essentially gatekeepers inside the knowledgebase that are responsible for sessions entering and exiting the federated knowledgebase. Exactly where the session travels outside of the knowledgebase, however, is controlled by the equipment assembly.

The term "subcomponent session mode" refers to a new mode for operating a knowledgebase, which allows for knowledgebase federation. Previous case-based reasoning systems have operated in a "regular" mode. With federated knowledgebases, a knowledgebase may operate in regular mode, for example, when it is the knowledgebase in which a session or workflow is initiated. However, when the session is handed off to a second federated knowledgebase, the second federated knowledgebase will be operated in the subcomponent session mode.

Figure 1:
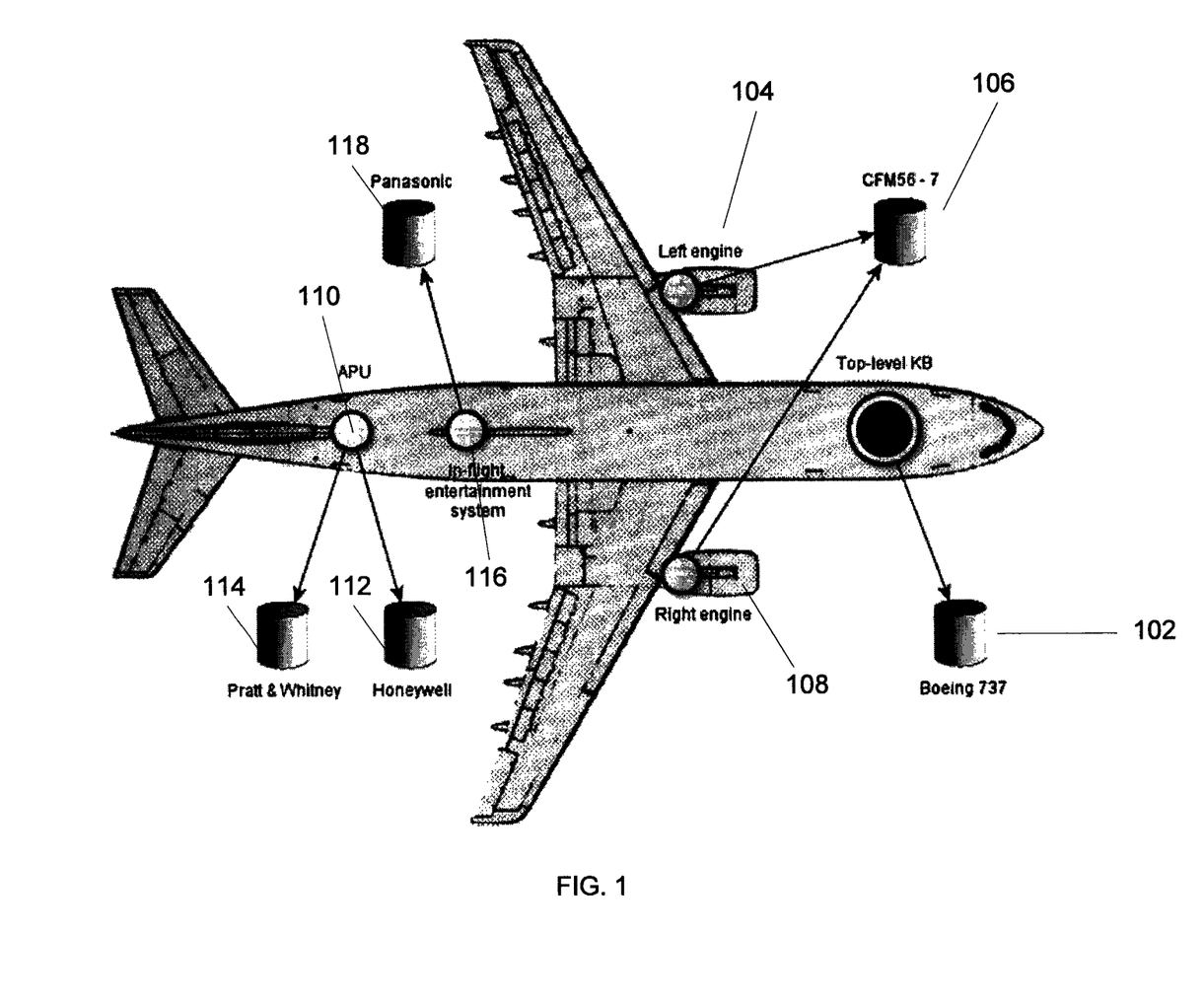
FIG. 1 is a diagram depicting a federation configuration with respect to the fitting points for an aircraft, according to some embodiments.

FIG. 1 provides an example of how a federation configuration can be derived with respect to a B737 aircraft. An aircraft knowledgebase 102 supports the B737 Aircraft, including variants-600 through -900. The B737 aircraft (including variants) may have fitting points for: a left engine, 104 (CFM56-7 option, 106), a right engine, 108 (CFM56-7 option, 106); an APU 110 (with the Honeywell 131 option 112, and/or Pratt & Whitney option 114); an in-flight entertainment system 116 (Panasonic option 118). A CFM56 engine knowledgebase covering all variants in the engine family might be federated with knowledgebases for: B737-300/-400/-500 (CFM56-3B1, -3B2, and -3C1 options); B737-600 through B737-900 (CFM56-7B18 through -7B27 options); A318 through A321(CFM56-5B1 through -5B9, and -5A series options); A340-300 (CFM56-5C2 through -5C4 options); DC8-70 (CFM56-2C1); KC-135 (CFM56-2B1); and an engine control computer.

A federation table can be used to identify the systems where other knowledgebases might be able to help. Each row in the federation table represents a fitting point. A fitting point is a data structure in the knowledgebase that corresponds to configuration options for the equipment covered by the knowledgebase, and the available options for each. Each fitting point contains the exact URLs for each of the target knowledgebases for that fitting point. Fitting points essentially define "what" can be assembled. FIG. 1 generally depicts some example fitting points for an aircraft.

Each border attribute describes one failure category. There can be more than one border attribute per fitting point, because there can be more than one type of problem with the equipment.

An equipment assembly defines "how" each of the fitting points are assembled for each troubleshooting session. As such, an equipment assembly identifies those federated knowledgebases that apply to a specific equipment item for troubleshooting. For example, an equipment assembly may include: "B737 Aircraft s/n 123 is a B737-700 with CFM-56-7B20 engines on both left and right engine fitting points, the APU is a Honeywell 131-9B, and it has no in-flight entertainment system (so therefore this fitting point is marked as unassigned)." An equipment assembly may also include, for example: "CFM56 Engine s/n 456 is a CFM-56-7B20 engine installed on a B737-700 aircraft."

A failure category is a relatively broad description of the type of problem that can be assisted by the other knowledgebase. Each failure category is mapped in the knowledgebase using a single border attribute. There can be several types of problems assisted by the other knowledgebase, and each failure category requires exactly one border attribute.

From the aircraft knowledgebase perspective, engine failure categories might be "fault message", "starting", "shutdown", "power", "oil", "fuel", "smell", "bleed air", "reverse thrust", etc. These can be few in number but high level, or greater in number and more focused—that is a knowledgebase design choice, but there is no concern about making the wrong choice initially because it is easy to change later on, to tweak performance.

The in-flight entertainment system failure categories might be symptoms like "error message", "system inop", "audio problem", "video problem", or "updating/loading problem".

A federated knowledgebase may differ from other knowledgebases in that it has at least one fitting point that points to another knowledgebase.

A session passport is a collection of data that travels with a session as it moves among federated knowledgebases. It holds all the information about where the session has been, and what was done, so that its return path can be guided, and the session path can be retraced. Every time a session goes to another knowledgebase, it's passport is "stamped" with additional information.

The passport tracks "handoffs", where the session is sent to a knowledgebase with a new symptom. The passport contains information needed for the execution of the handoff. For confidentiality reasons, it does not contain historical session data from prior knowledgebases visited along the path unless specifically configured to do so by agreement of the participants.

The Knowledgebase Development Interface ("KBDI") documents the agreement made between the owners of each federated knowledgebase pair regarding how they will exchange data—specifically, which failure categories exist on either side. Those failure categories are then encoded into symptom keywords which are assigned to border attributes. It is similar in concept to a software API (Application Program Interface) in that it does not contain data itself, but it is a protocol that defines how the data are exchanged, as determined by the passport protocol.

Owners of federated knowledgebases have the ability to agree and control how symptoms sent from one knowledgebase are to be recognized by the receiving knowledgebase. E,g., will an incoming symptom be recognized through the case-based-reasoning system's symptom search text recognition function? Or is the symptom expected to have an unambiguous perfect match on the receiving end, allowing the session to launch without further user engagement? Or Look-up tables? Or Boolean logic utilities with custom formulas? It is up to the knowledgebase owners to decide the level of automation desired using methods such as these.

The passport protocol is the case-based-reasoning software mechanism that manages the interface between two federated knowledgebases. It implements the agreement documented in the KBDI. The passport protocol is the 'operational' part of the KBDI. It implements the free-text symptom search vs exact match vs lookup table vs Boolean logic, etc.—or a hybrid of these as agreed by owners of the two federated knowledgebase to which this applies.

Figure 2:
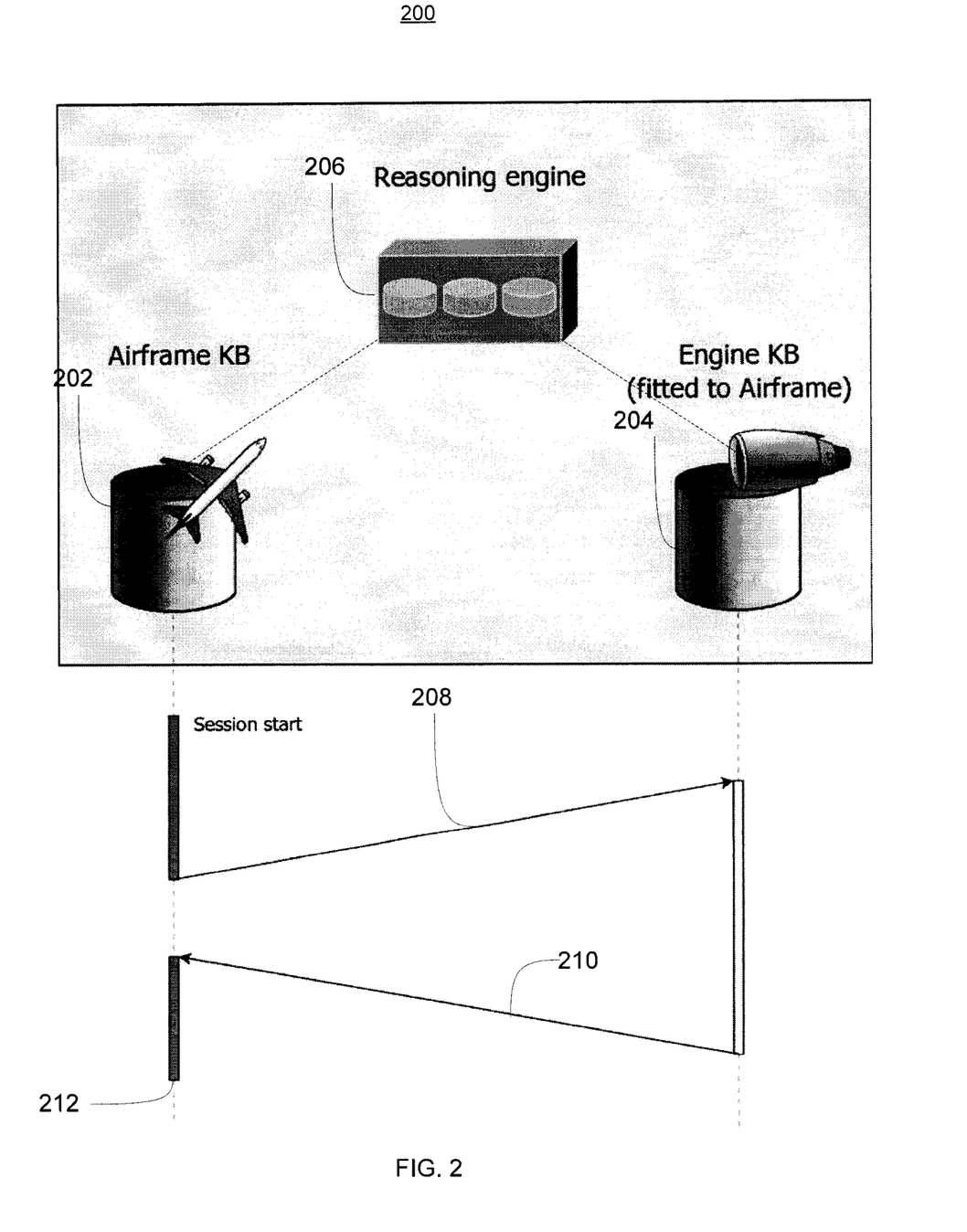
FIG. 2 is a schematic diagram depicting how knowledgebase federation for two knowledge-based information retrieval systems using case-based reasoning will appear to a technician, according to some embodiments.

Referring to FIG. 2, there is shown a depiction of how knowledgebase federation may appear to a technician, according to one embodiment. There are two knowledgebases 202 and 204. Two or more knowledgebases may share a single case-based reasoning engine 206, such that the single case-based reasoning engine 206 can perform troubleshooting operations on both knowledgebases 202 and 204. One knowledgebase 202 is for the airframe type, operated by the aircraft manufacturer, and the other knowledgebase 204, is for the engine family, operated by the engine manufacturer.

For example, a technician goes to the airframe knowledgebase 202 to troubleshoot a "hung start" problem with the engine. This troubleshooting may be accomplished by utilizing a computerized troubleshooting system that uses a knowledgebase of solved cases and case-based reasoning to solve new cases, such as the SpotLight® case-based reasoning system provided by the applicant. The SpotLight system is described in U.S. Pat. No. 5,822,743 entitled "Knowledge-based Information Retrieval System", U.S. Pat. No. 6,026,393 entitled "Configuration Knowledge as an Aid to Case Retrieval", and U.S. Pat. No. 7,225,176 entitled "System and Methods for Case-based Reasoning", owned by the applicant, which are hereby incorporated by reference.

The case-based reasoning engine 206, for example, as provided by the SpotLight® case-based reasoning system, starts troubleshooting aircraft causes for a hung start, and at the same time identifies all other federated knowledgebases that might be able to assist with a hung start problem in the engine.

The case-based reasoning engine 206 soon suggests that the engine knowledgebase 204 may be able to help with this problem, and one click 208 transfers the session over to the engine knowledgebase 204. The technician is still in the same troubleshooting session, but it is now reasoning with the engine knowledgebase 204. One of three things can happen over in the engine knowledgebase 204. First, the cause may be found in the engine knowledgebase 204, and the session ends right there. Second, there is no cause found in the engine knowledgebase 204, and the session returns to the airframe knowledgebase 202. In the third alternative, the engine knowledgebase 204 may suspect a problem with something in another system that is affecting it, and sends the session there.

In this example, let us say that the engine knowledgebase 204 suspects a problem with the aircraft fuel system, so with one click 210 from the technician, the session is sent to the airframe knowledgebase 202 to continue troubleshooting a more focused symptom: Insufficient fuel supply to the engine. The cause 212 is found to be a blocked fuel filter in the aircraft fuel supply system. The session is closed, and both knowledgebases are informed of this.

Knowledgebase 202 and knowledgebase 204 in FIG. 2 may each be owned, built, and maintained by different companies, or divisions within a company.

Figure 3:
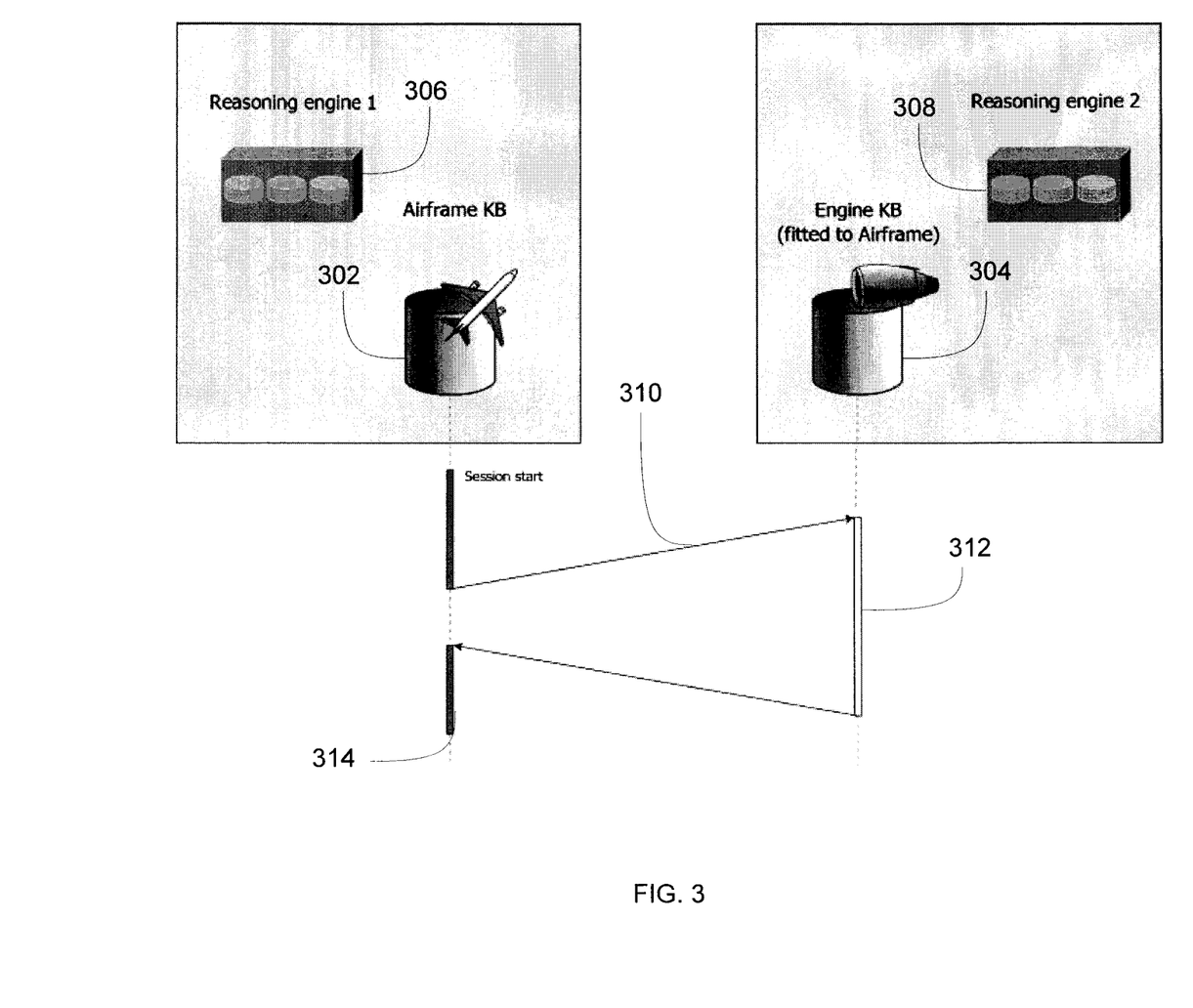
FIG. 3 is a schematic diagram depicting how knowledgebase federation for two knowledge-based information retrieval systems using case-based reasoning will appear to a technician, according to some embodiments.

Referring to FIG. 3 and according to one embodiment, knowledgebases 302 and 304 may each include their own reasoning engines 306 and 308. According to this embodiment, one knowledgebase 306 is for the airframe type, operated by the aircraft manufacturer, and the other knowledgebase 308, is for the engine family, operated by the engine manufacturer.

A similar example of a work flow as discussed for FIG. 2 can be realized for FIG. 3. However, in FIG. 3, the case-based reasoning engine 306 associated with the airframe knowledgebase 302 may start troubleshooting aircraft causes for a hung start, and at the same time, identify all other federated knowledgebases that might be able to assist with a hung start problem in the engine.

The case-based reasoning engine 306 soon suggests that the engine knowledgebase 304 may be able to help with this problem, and one click 310 transfers the session over to the engine knowledgebase 304 and to the associated case-based reasoning engine 308. The technician is still in the same troubleshooting session, but the case-based reasoning is now being handled by the case-based reasoning engine 308 associated with the engine knowledgebase 304. Subsequently, with one click 312 from the technician, the session is sent to the airframe knowledgebase 302, after which, the case-based reasoning engine 306 associated with the airframe knowledgebase 302 may resume the case-based reasoning session. The session may be closed when the cause 314 is found, and both knowledgebases are informed of this.

According to some embodiments, case-based reasoning engine 206 or case-based reasoning engine 306 may search for an initial symptom across all connected knowledgebases in order to determine where the session should start, prior to directing the session towards a particular knowledgebase. The case-based reasoning engines can be used to determine which knowledgebase may be the optimal knowledgebase with which to begin the session.

Multiple pairs of knowledgebases can be federated. For example, an aircraft knowledgebase can be federated with knowledgebases operated by suppliers for the engine, the avionics, the landing gear, the environmental control system, the APU, etc. In addition, the same engine knowledgebase can be federated with knowledgebases operated by several airframe manufacturer customers. In all cases the reasoning will be appropriate for the configuration of the equipment. In each case, the knowledgebase owner controls access to its knowledgebase content and troubleshooting session data.

Knowledgebases may be federated in pairs, requiring only a small amount of coordination. Each of the paired federated knowledgebases may agree on how it will communicate necessary information when handing a session back and forth; notably, the method by which initial symptoms will be interpreted by the receiving knowledgebase.

This agreement is documented in a Knowledgebase Development Interface ("KBDI"), which serves as the basis for defining the Passport Protocol.

Knowledgebase federation allows equipment manufacturers to maintain their own knowledgebases for their equipment, and yet share that knowledge directly with their customers and suppliers during troubleshooting, while maintaining full control of their own knowledgebases, including who accesses it.

This approach has several key benefits. For a prime equipment manufacturer, its (aircraft) cased-based-reasoning troubleshooting system can draw upon the deep and broad knowledge that its sub-system (engine) supplier has in its knowledgebase, and it can avoid duplicating the effort of re-creating and updating troubleshooting procedures for their supplier's equipment.

For a sub-system (engine) manufacturer, its knowledgebase can stand as its primary troubleshooting tool, and it can also be federated with the case-based-reasoning troubleshooting systems operated by any of its customers for relevant equipment (aircraft), giving greater reach to its troubleshooting strategy while at the same time reducing the overall cost of its own troubleshooting system. Both participants in the federation gain greater visibility into field troubleshooting, while at the same time reducing total effort to build and maintain their troubleshooting tools.

For end users (technicians), the knowledge-based information retrieval system using case-based reasoning will take them to knowledgebases that contain best available information for troubleshooting the problem at hand.

A few points of agreement are required between owners of two knowledgebases to be federated. Primarily, the two federated knowledgebases must be made aware of each other. This is done through federation configuration, as further described below, and if they are not connected to the same reasoning engine, by providing the URLs to the knowledgebases.

Also, subject domains of the knowledgebases need to be connected. This is done by identifying the failure categories (high-level symptoms) in one knowledgebase for which a cause might be found in the other knowledgebase, and inserting special attributes for those failure categories.

Knowledgebase development is otherwise normal, and independent of its federated knowledgebases.

Existing knowledgebases can be federated, with the addition of the federation configuration and a few special attributes and adjustments.

The technician may see smooth migration to the best available troubleshooting guidance as a single troubleshooting session transitions across multiple knowledgebases, each of which addresses a different subsystem.

Figure 4:
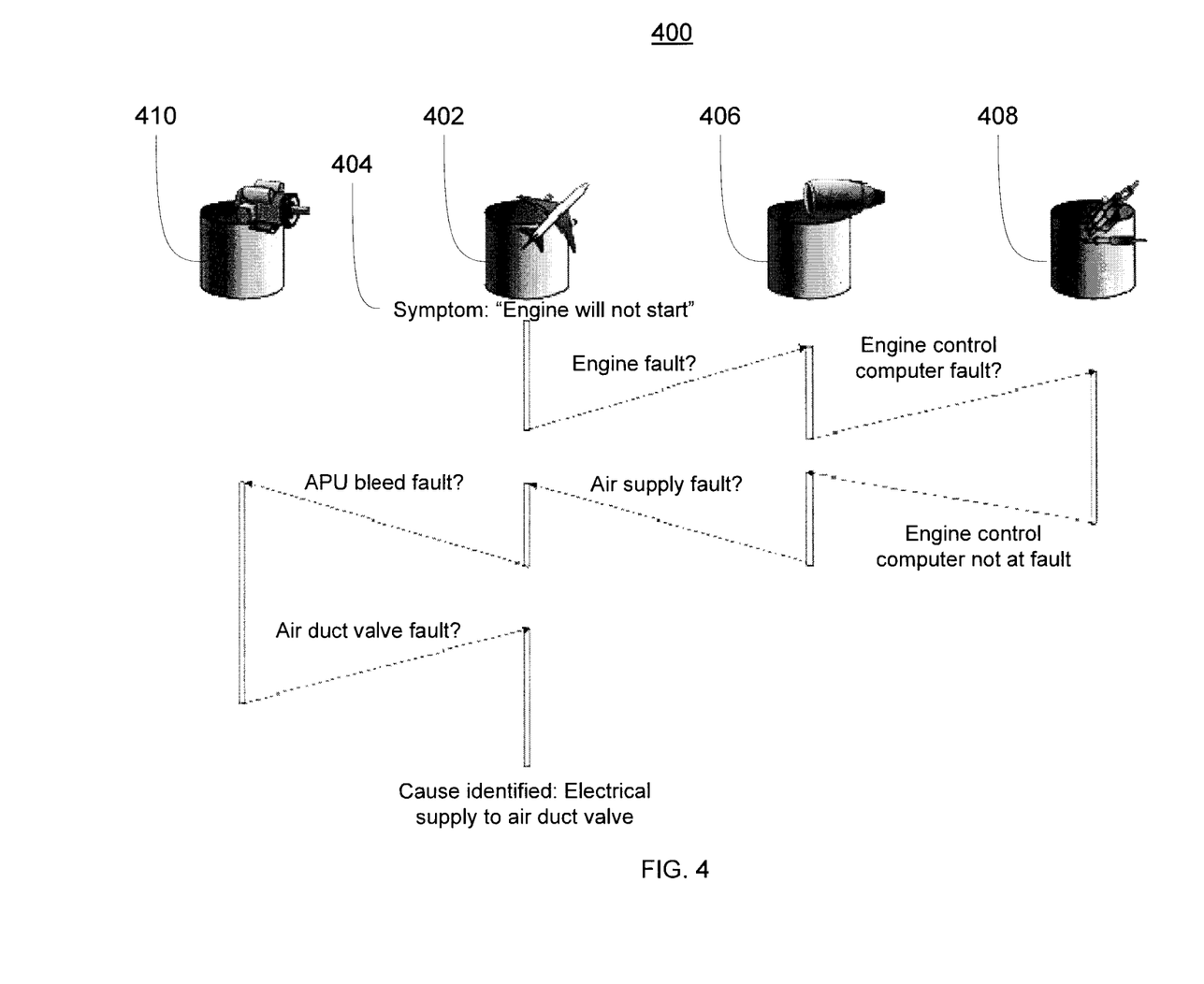
FIG. 4 is a flow diagram depicting a session transition across federated knowledgebases, according to some embodiments.

An example trouble-shooting session 400 is depicted in FIG. 4. The technician opens the aircraft knowledgebase 402 and selects "Engine Will Not Start" as the initial symptom 404. The troubleshooting system automatically searches the knowledgebases federated with the aircraft, and finds a match in both the aircraft knowledgebase 402 and the engine knowledgebase 406. The technician clicks on the aircraft knowledgebase match and troubleshooting begins in the aircraft knowledgebase 402. Before long, the aircraft knowledgebase 402 recognizes that the cause might be in the engine itself, and the case-based reasoning system takes the technician to the engine knowledgebase 406.

Typically, the cause will be found by the engine knowledgebase 406, and the session will terminate there. In such a case, a message will be sent back to the aircraft knowledgebase that the cause was found by the engine knowledgebase 406, and the entire case-based reasoning session will be closed. But, let's say this is an elusive problem, and the answer is not found in the engine knowledgebase 406. In this case, the session continues.

Based on troubleshooting answers in the engine knowledgebase 406, the case-based reasoning system suggests that the problem might be caused by the engine control computer, for which, in this example, there exists an engine control computer knowledgebase 408, so the session is handed off there. The engine control computer knowledgebase 408 finds no fault, and so the session is handed back to the engine knowledgebase 406. The engine knowledgebase 406 then determines there is no starter air coming from the aircraft, so the session is handed back to the aircraft knowledgebase 402, now looking for an air supply problem to the engine starter.

The aircraft knowledgebase 402 continues troubleshooting, but then sees evidence that the problem could be with the APU bleed air supply, so the session is handed off to the APU knowledgebase 410. The APU knowledgebase 410 determines that its bleed air supply is fine, but the aircraft duct valve is not opening when it should, and so the session is handed back to the aircraft knowledgebase 402 once again, this time looking for a reason that the valve is not opening. An electrical cause is indeed found, the repair is made, and the session closes.

The case-based reasoning system has seamlessly used the technician's initial symptom to search automatically across several other knowledgebases, and other special attributes to seamlessly migrate the session to the best available troubleshooting guidance.

From the perspective of the knowledgebase owners, the technician has been smoothly guided into their knowledgebases, and out of their knowledgebases, at the appropriate times.

As noted above, a few points of agreement are required between owners of two knowledgebases to be federated. First, the two federated knowledgebases must be made aware of each other. This is done by identifying the failure categories (high-level symptoms) in one knowledgebase for which a cause might be found in the other knowledgebase. Furthermore, the URLs to the knowledgebases must be provided.

Second, subject domains of the knowledgebases need to be connected. This is done by identifying the failure categories (high level symptoms) in one knowledgebase for which a cause might be found in the other knowledgebase and inserting special attributes for those failure categories.

Any two federated knowledgebases need to agree on process, notably "how will the receiving knowledgebase recognize the symptoms to be transmitted between them?" That method is documented in the KBDI that applies to those two knowledgebases, enabling them to understand each other's communications while federating.

The KBDI should also document the IP sharing permissions (access to the knowledgebase content) and a mechanism for sharing session information in a manner that is coherent with any relevant commercial arrangements that may be in place. For example, sensitive information (meaning information that one party would not want to disclose to another party) may be removed or not included in the session information or session passport, so that the sensitive information is not transmitted to the other party. Sensitive information may include (but is not limited to) information related to intellectual property, trade secrets, commercial information, etc.

Access credential checking for users can be automated, if desired and if the technical infrastructures of all participants support it, to create seamless transition between knowledgebases for users.

Federation allows the knowledgebase developer to focus efficiently. Each company can maintain its own knowledgebase without having to coordinate extensively with its federated knowledgebase associates. The methods and systems described herein may enable two knowledgebases to communicate by passing symptoms and other data back and forth, which happens largely behind the scenes. Furthermore, participants can optimize their knowledgebase development effort by dividing responsibilities along their equipment areas of responsibility.

For example, an airframe knowledgebase can hold solutions that are unique to it (problems with the interface between an engine and an aircraft, for example). An engine knowledgebase can hold solutions that are generic to it (problems that could happen on that type of engine no matter what type of aircraft it was installed on). However, there is nothing preventing both knowledgebases from holding same/similar solutions. A user will find one of them before the other, and the session will terminate at that point.

Federation requires focus on only one pair of knowledgebases at a time. For example, focus on the airframe and engine knowledgebases now, and on the airframe and APU knowledgebases later. There is no need to ponder the complete network of federated knowledgebases at one time. The tools of the knowledge-based information retrieval system will produce a summary report of all federations for a knowledgebase.

Existing knowledgebases can be federated, with the addition of the federation configuration, as further described below, and a few special attributes and adjustments.

Figure 5:
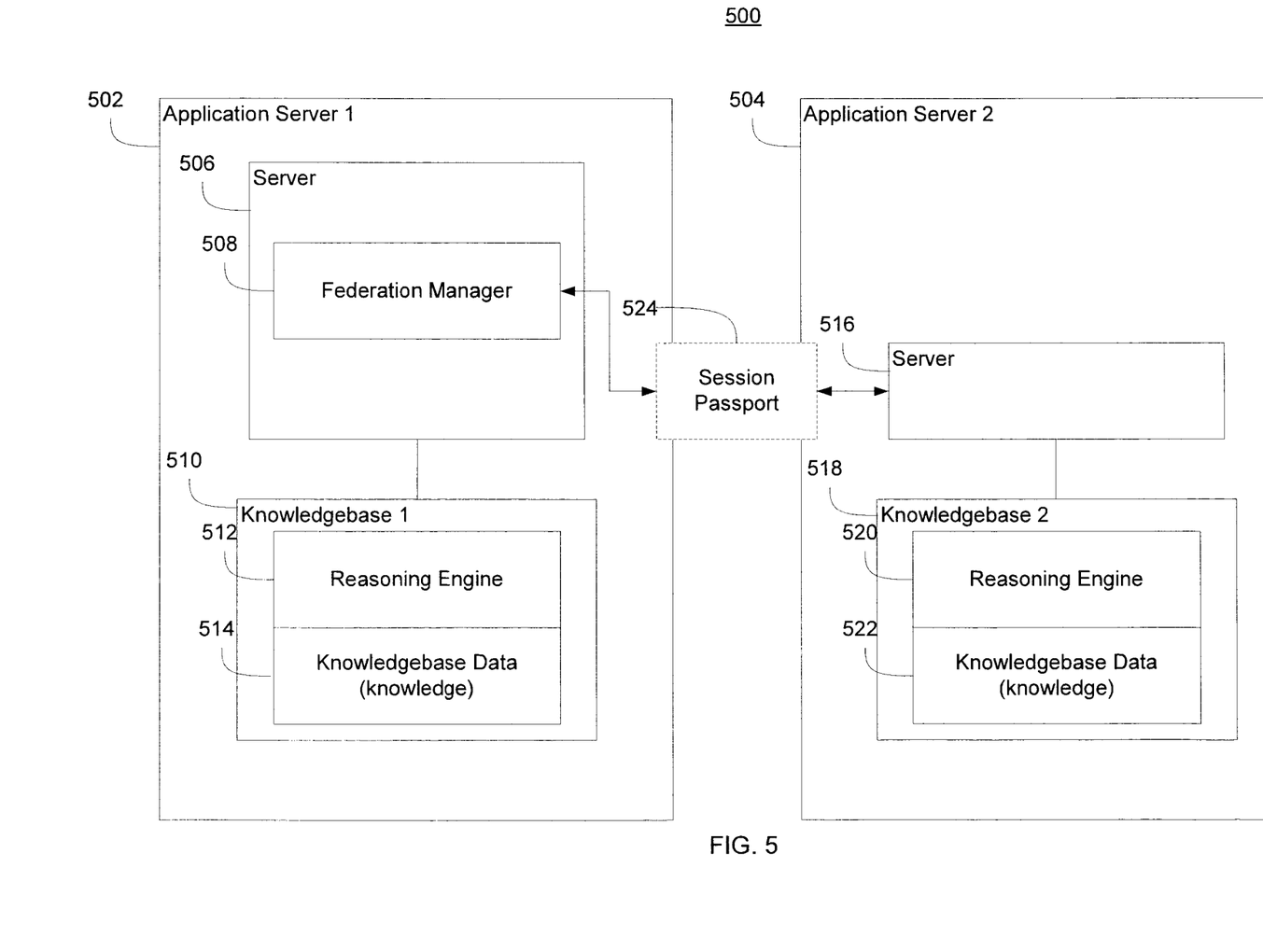
FIG. 5 is a schematic diagram of a system for troubleshooting problems in a complex system using multiple knowledgebases.

Referring to FIG. 5, there is shown a system 500 for troubleshooting problems in complex equipment using multiple knowledgebases.

The system 500 comprises a first application server 502 and a second application server 504, which define the boundaries for session hand-off and hand-back.

The first application server 502 includes a server 506 (e.g. a case-based reasoning server such as a Spotlight® Server provided by the applicant), as well as a knowledgebase 510. Similarly, the second application server 504 includes a server 516 and a knowledgebase 518.

Each of the knowledgebases 510 and 518 may constitute a conventional knowledgebase that has been altered for knowledgebase federation as described herein. As such, the knowledgebases 510 and 518 each contain their own case-based reasoning engines 512 and 520 respectively, as well as their own knowledgebase data 514 and 522 respectively.

The knowledge data 514 and 522 are related in that the sets of knowledge that they contain pertain to common components or machines. According to some embodiments, the sets of knowledge contained in each of the knowledgebase data 514 and 522 are related with respect to a machine-component hierarchy and some practical or topical commonality. For example, if the knowledge data 514 pertains to a truck (machine level knowledge), then the knowledgebase data 522 might pertain to an engine found in that truck (component level).

As shown, the server 506 pertaining to the application server 502 (and therefore associated with the knowledgebase 510) includes a Federation Manager 508. According to some embodiments, the server 516 may also include a Federation Manager (not shown).

The system 500 includes a session passport 524, which can travel across the session boundaries defined by the application servers 502 and 504, according to the Federation Manager 508.

Figure 6:
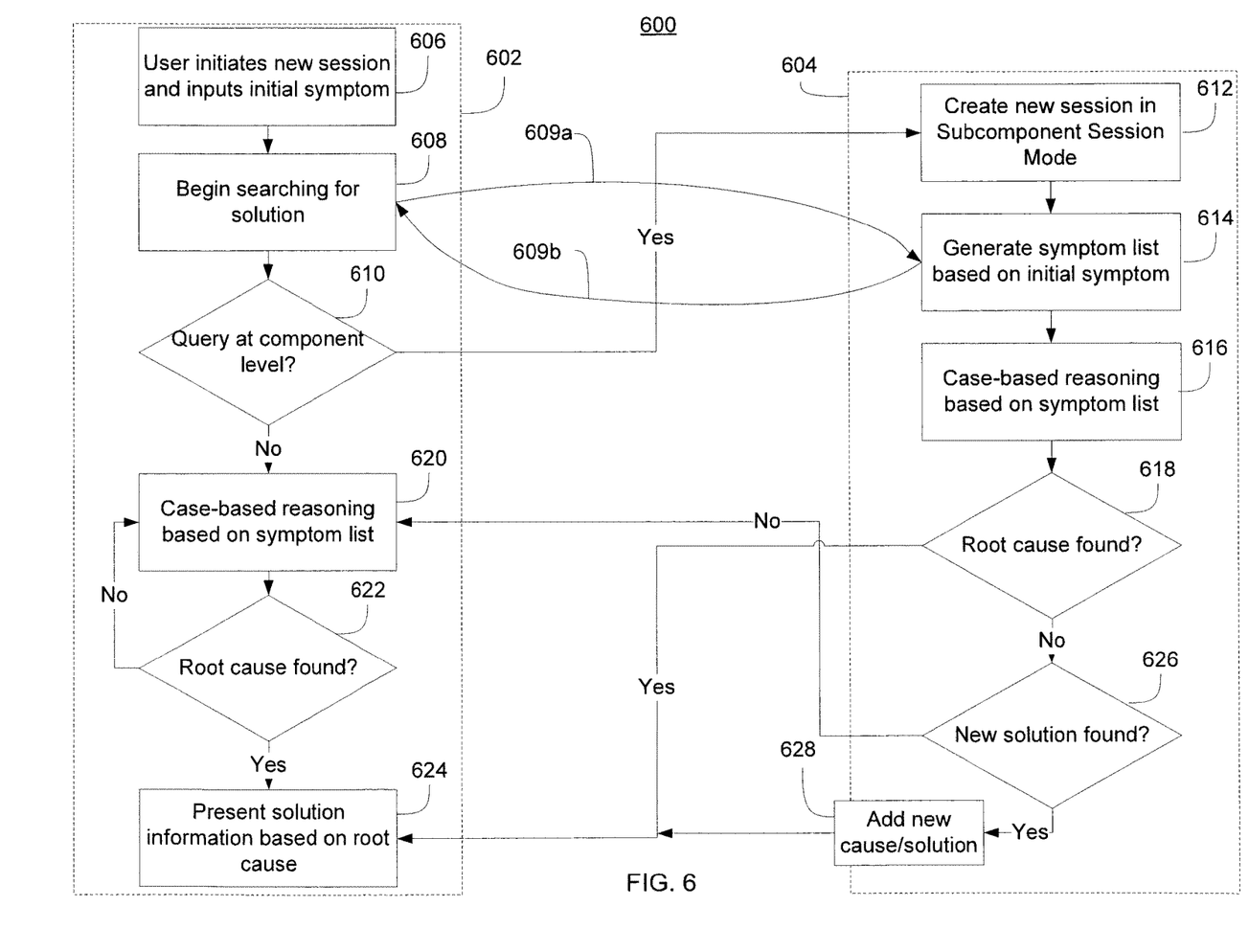
FIG. 6 is a flow diagram depicting a session transition across federated knowledgebases, according to some embodiments.

Referring to FIG. 6, there is shown a method 600 for troubleshooting problems in complex equipment using multiple knowledgebases.

FIG. 6 depicts case-based reasoning and session transitions across a first federated knowledgebase 602 and a second knowledgebase 604. According to the embodiment depicted, the first federated knowledgebase 602 pertains to a higher-level (or "machine") knowledgebase, and the second knowledgebase 604 pertains to a lower-level (or "component" or "sub-component") knowledgebase. For example, knowledgebase 602 may pertain to a truck, and knowledgebase 604 may pertain to an engine that is a part of the truck.

At 606, a user initiates a new session and inputs initial symptoms. For example, a technician working with a truck may start a new case-based reasoning session and input the initial symptom "low engine power".

At 608, the case-based reasoning engine begins searching for a solution (or solutions) that correspond to the initial symptom. The case-based reasoning engine runs a first round of reasoning against the truck (higher-level) knowledgebase. In the example, one question presented to the technician might be "what is the result of troubleshooting the engine for low power symptoms?" Rather than being presented with particular values as possible responses to this question, the technician may be presented with a button that says "troubleshoot the engine".

According to some embodiments, step 608 can include querying any knowledgebases federated with the knowledgebase 602 in order to generate a symptom list from the other federated knowledgebases. In other words, when a technician inputs an initial symptom at 606, it is possible to query any of the other knowledgebases in order to determine the relevant symptoms that pertain to each of the other knowledgebases. This is indicated by the lines 609a and 609b in FIG. 6, showing a round trip from the first knowledgebase 602 to the second knowledgebase 604, and, more particularly, that the second knowledgebase is taking the preliminary step of generating a symptom list based on the initial symptom prior to step 610.

At 610, a selection can be made that allows for a component-level query to be run, where the query involves the second database 604. Referring again to the example, the technician can press the button, thereby initiating session hand-off.

According to some embodiments, at 610, the option to query may be informed by the return trip 609a, 609b, to the second knowledgebase 604. When the method begins search for a solution at 608, it may query any other knowledgebases that are federated with the knowledgebase 602 in order to generate a symptom list from the other federated knowledgebases. In this case, the option to query at the component level 610 will include components relevant to the symptoms provided by the other federated knowledgebases (or the symptoms themselves).

If there are multiple federated knowledgebases (i.e. more than two), then, when a decision is made at 610 to query another knowledgebase (i.e. to transfer the session to another knowledgebase), the destination knowledgebase is determined based on the component or symptom that is to be queried. For the sake of simplicity, FIG. 6 depicts an option to transfer the session to the second knowledgebase 604. However, it is possible that there may be other federated knowledgebases (not shown). In this case, some of the knowledgebases may not provide a symptom list to inform 610 (e.g. if a knowledgebase is deemed to not be relevant to the initial symptom). Other knowledgebases may provide a symptom list to inform 610. Ultimately, the session will be transferred to the appropriate knowledgebase according to which component or symptom is selected for further query.

According to some embodiments, at 610, the option to query at the component level may be provided to a user so that the user can make a decision as to whether to query at the component level. According to other embodiments, at 610, the option to query at the component level may be automatically selected without input from a user.

The option to query at the component level need not be taken, in which case, at 620, case-based reasoning resumes on the higher-level knowledgebase 602.

When the option to query at the component level is taken, then, at 612, a new session is created in the second knowledgebase, such that the second knowledgebase 604 is run according in the subcomponent session mode. For example, information that the current case pertains to "low engine power" is taken into the new session. The session record in the higher-level knowledgebase 602 (e.g. the truck knowledgebase) is put into a suspended state.

At 614, a list of symptoms is generated based on the initial symptom. In the example, the technician would be presented with all of the symptoms from the engine knowledgebase that can result in low engine power.

The fact that the engine knowledgebase is operating in subcomponent session mode affects how the session operates as follows. As explained above, the symptom list presented to the technician is limited to only those symptoms that can result in low engine power. Once a symptom is selected, it becomes a mandatory observation, meaning that only solutions that contain that symptom observation can be considered during the course of troubleshooting within the subcomponent (engine) knowledgebase. At any time, the technician can go back to the symptom list and change the selected symptom, though any change will be confined to the original list that was presented.

At 616, case-based reasoning resumes, based on the original symptom list and any symptom that the user has selected. For example, one of the questions offered to the technician might be "is the engine fuel intake valve clogged?" If, after checking the fuel intake valve, the technician answers in the affirmative, the root cause has been determined. If the root cause has not been determined, the case-based reasoning engine of the second knowledgebase 604 can continue to search for root causes until all possibilities have been exhausted.

If, at 618, the root cause has been determined, then the session can be transferred back to the first knowledgebase 602, taking with it the information pertaining to the root cause. For example, the information that the engine is overheating due to internal causes, as well as any solution instructions, system theory, etc., may be transmitted back to the truck knowledgebase (where the technician originated the session). Since the root cause for the problem is internal to the engine in this case, the knowledgebase knows that the troubleshooting is finished.

At 624, the solution information is presented to the user. All problem fix information, such as warnings, cautions, and alerts and the like (for example from the truck knowledgebase) is combined with information returned (for example from the engine knowledgebase), and is presented to the technician in a similar way as would be done for a non-federated knowledgebase approach.

It is also possible that session transitions 600 across the first federated knowledgebase 602 and the second knowledgebase 604 might not involve a root cause being found in the second knowledgebase 604. In other words, at 618, after all possibilities in the second knowledgebase 604 have been exhausted, the session can be transferred back to the first knowledgebase 602 with an indication that the root cause is not related to a component-level problem.

According to some embodiments, the indication that the root cause has not been found in the second knowledgebase 604 can be accompanied with additional information that the second knowledgebase 604 has provided with regards to the symptom. In other words, while the second knowledgebase 604 may be able to exhaustive conclude that it does not contain a root cause or solution, it may also be able to provide information (e.g. a partial solution) that will allow another federated knowledgebase to find a root cause or solution. Thus, the session trip (hand-off and hand-back) to the second knowledgebase 604 has provided a benefit. Even though it has not provided a root cause or solution, it has provided some additional facts for consideration by another knowledgebase.

For example, after exhausting all possibilities in the engine knowledgebase, only a single candidate solution with relevant similarity to the initial symptom is left, which states that the engine is overheating due to a malfunction outside of the engine. In such a case, the technician can select this solution, and the troubleshooting is taken back to the truck knowledgebase, with the information that the engine is overheating due to external causes.

When it has been determined at 618 that no root cause was found in the lower-level (second) knowledgebase 604 (and that a new solution that is not currently in the knowledgebase 604 has been identified by a user at 626), case-based reasoning resumes in the higher-level (first) knowledgebase 602, so that a solution can be determined.

For example, one of the solutions associated with an overheating engine in the truck knowledgebase might be to clean the engine cooling radiator. This solution has amongst its descriptors an observation that the engine is overheating due to external causes, and the next suggested question comes from another attribute that has an observation in this solution, such as "is the engine cooling radiator clogged with debris?"

After checking whether the engine cooling radiator is clogged with debris, the technician answers in the affirmative, and the root cause for the low engine power problem is found. In this case, the root cause is confirmed at 622, and the solution information based on the root cause is presented at 624.

According to some embodiments, even though the second knowledgebase has not provided a root cause or solution at step 618, it has nonetheless provided information that will allow the first knowledgebase 602 to conduct a more refined search. In other words, in some cases, when it has been determined at 618 that no root cause was found in the lower-level knowledgebase 604, case-based reasoning can be resumed in the higher-level knowledgebase 602. However, in consideration of the information provided by the second knowledgebase 604, the resumed case-based reasoning can be more efficiently directed towards ultimately finding the root cause or solution.

In some cases, it is possible that a new solution may be found at 626 by a user. For example, while searching for a solution in the engine knowledgebase (e.g. the second knowledgebase 604), the technician may find a new solution for the engine problem, by observing that an engine fuse is burned out, even though this was not offered amongst the symptoms provided by the case-based reasoning engine. In this case, the knowledgebase 604 may offer the technician the choice of options at 626, based on whether the technician has found a new solution. For example, the options presented to the technician may be: a) there is no problem in the engine; or b) a new solution has been found for an engine problem. If the technician chooses option b), then the knowledgebase 604 allows the technician to input the details of the new solution. After the new solution has been input at 628, the session is transferred to the higher-level knowledgebase 602, and the session is automatically closed, without any observation set for the border attribute.

While the above examples and descriptions are provided in terms of a session originating on a higher-level knowledgebase, being handed-off to a lower-level (e.g. component-level) knowledgebase, and then being handed back to the higher-level knowledgebase, it should be appreciated that knowledgebase federation allows for session origination, hand-off, and hand-back for any combination of federated knowledgebases.

According to some embodiments, a technician could begin a session on a lower-level knowledge base. The session could then be handed off to a higher-level knowledgebase. Relying on the above example, it is possible that a technician may start the session at the engine knowledgebase, and then be led to a root cause and solution that is external to the engine, and actually pertains to the truck, using the truck knowledgebase.

According to some embodiments, a technician could begin a session on a knowledgebase of a particular level of machine-component abstraction, and the session could then be handed off to another knowledgebase of the same level. Again relying on the above example, it is possible that a technician may start the session on the engine knowledgebase, and then be led to a root cause and solution that is external to the engine, and actually pertains to the fuel pump, using the fuel pump knowledgebase. In this example, the engine knowledgebase and the fuel pump knowledgebase are both at the same component level in respect of the truck (machine level).

Furthermore, the above examples and descriptions relate to session hand-off and hand-back between two federated knowledgebases only. However, it should be appreciated that the session hand-off and hand-back can be nested or cascaded among any number of knowledgebases. In this way, a session can travel across any number of federated knowledgebases. For example, a session may be handed off from a first knowledgebase to a second knowledgebase, and then further handed off from the second knowledgebase to a third knowledgebase. Subsequently, a chain of hand-back transactions could ultimately return the session back to the first knowledgebase.

Figure 7:
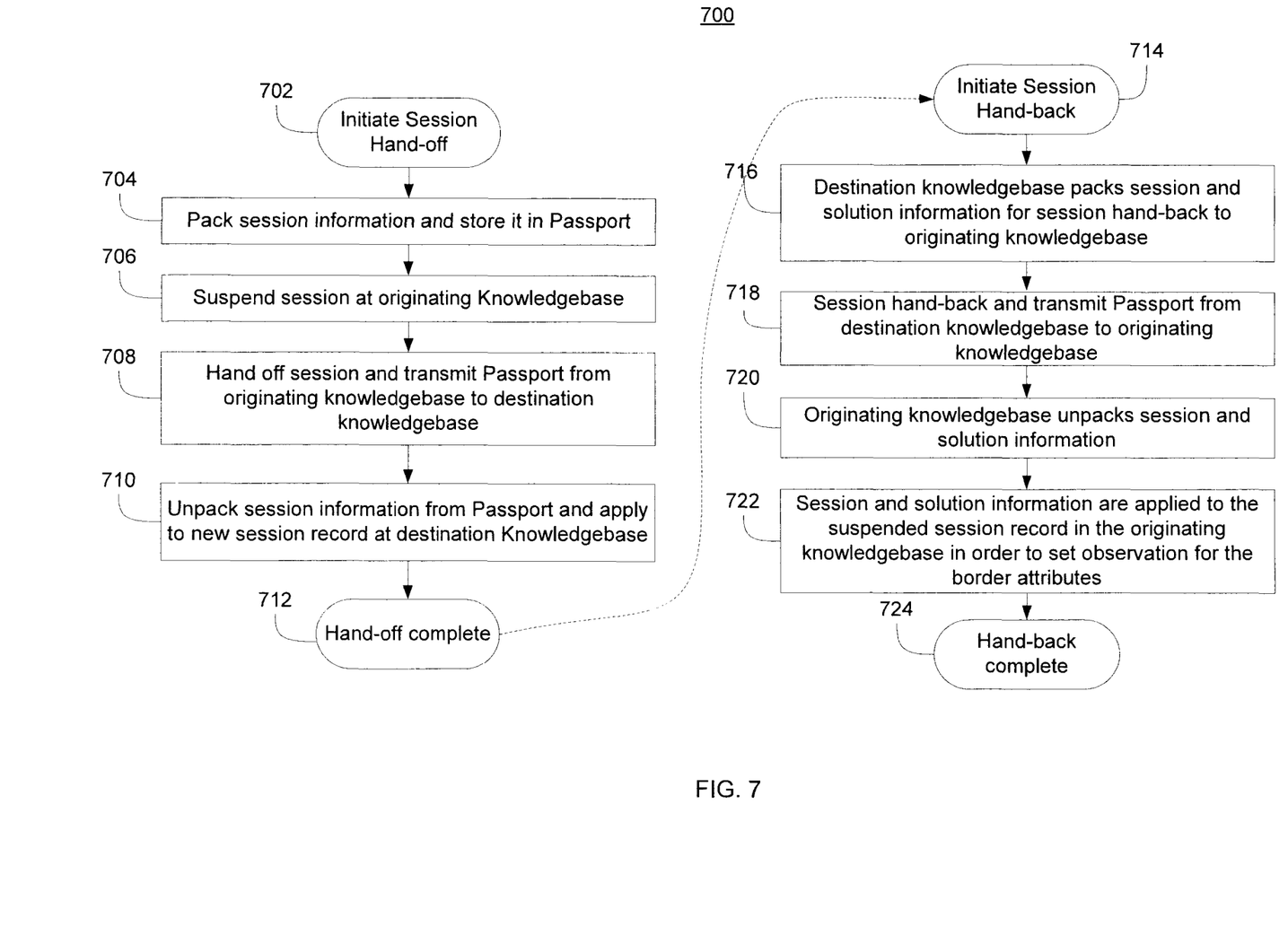
FIG. 7 is a flow diagram depicting a session transition using a session passport according to a session passport protocol.

Referring to FIG. 7, there is shown a flow diagram depicting a session transition using a session passport pursuant to a session passport protocol, according to some embodiments. According to some embodiments, the session transition is handled by the Federation Manager. In order to assist in the explanation of FIG. 7, the terms "originating knowledgebase" and "destination knowledgebase" will be used with respect to the handing off and handing back of the session. However, it should be understood that the "originating knowledgebase" is akin to the first knowledgebase 602 of FIG. 6, and that the "destination knowledgebase" is akin to the second knowledgebase 604 in FIG. 6.

At step 702, the Federation Manager determines that a session hand-off is required. The first step in the session handoff is step 704, in which comprises packing relevant session information into a serializable format and storing it into the session passport prior to session handoff. The Federation Manager subsequently suspends the session at the originating knowledgebase.

At step 706, the Federation Manager hands off the session by transmitting the session passport from the originating knowledgebase to the destination knowledgebase.

At step 710, after the session passport is received at the destination knowledgebase, the session passport is unpacked. The Federation Manager then applies the session information from the session passport to the new session record at the destination knowledgebase in order to set initial observations, event details, etc.

At step 712, the hand-off of the session is complete. Subsequent session information will be generated and stored in the session record at the destination knowledgebase.

After the hand-off is complete, the session is effectively under the control of the destination knowledgebase. It should be noted, as was previously described, that while the destination knowledgebase effectively runs the session in order to conduct its own case-based reasoning, the destination knowledgebase is running in subcomponent session mode.

The destination knowledgebase continues to conduct its own case-based reasoning session, until one of three events happen.

First, the destination knowledgebase and/or the Federation Manager may determine that the session should be transferred to a third knowledgebase, such as a sub-component knowledgebase (i.e. a lower-level knowledgebase), a machine knowledgebase (i.e. a higher-level knowledgebase), or a knowledgebase at the same level (i.e. a peer knowledgebase). In this case, the destination knowledgebase effectively becomes a new originating knowledgebase, and the third knowledgebase effectively becomes a new destination knowledgebase. With this in mind the new handoff can be thought of as starting at a new iteration of step 702.

Second, the destination knowledgebase may generate a root cause and solution.

Third, the destination knowledgebase may exhaustively determine that the root cause does not pertain to the destination knowledgebase.

In the last two scenarios, the Federation Manager determines that the session should be handed back to the originating knowledgebase.

At step 714, the Federation Manager initiates the session hand-back. This begins at step 716, by packing session information and solution information into the session passport.

At step 718, the session is handed back from the destination knowledgebase to the originating knowledgebase, and the session passport is transmitted from the destination knowledgebase to the originating knowledgebase.

At step 720, the Federation Manager and/or the originating knowledgebase unpacks the session information and the solution information from the session passport. The solution information may contain the root cause and/or solution as determined by the destination knowledgebase, or the solution information may contain an indication the root cause and/or solution do not pertain to the destination knowledgebase.

At step 722, the session and solution information are applied to the suspended session record of the originating knowledgebase, in order to set observations for the border attributes at the originating database. The session record of the originating knowledgebase is then resumed.

At step 724, the hand-back can be deemed to be complete.

While the above description provides examples of one or more apparatus, methods, or systems, it will be appreciated that other apparatus, methods, or systems may be within the scope of the claims as interpreted by one of skill in the art.

The invention claimed is:

1. A system for troubleshooting equipment problems, the system comprising:
   a user computing device configured to receive initial attribute data from a user and present at least one possible solution to the user;
   at least one server comprising a processor and at least one computer-readable storage medium operatively coupled to the processor, the at least one computer-readable storage medium comprising program code executable by the processor, the processor being operable to:
   (a) receive the initial attribute data from the user computing device, the initial attribute data relating to symptoms of a problem with a first equipment;
   (b) apply the initial attribute data to a first session at an originating knowledgebase to determine a first set of possible solutions, the originating knowledgebase comprising a first case-based reasoning engine and a first knowledge database operatively coupled to the first case-based reasoning engine, the first knowledge database storing a first set of knowledge data pertaining to the first equipment, the first session generating first session information data;
(c) implement a federation manager configured to:
(i) identify a destination knowledgebase comprising a second case-based reasoning engine and a second knowledge database operatively coupled to the second case-based reasoning engine, the second knowledge database storing a second set of knowledge data pertaining to a second equipment that is a component of the first equipment;
(ii) generate an initial session passport comprising the first session information data and at least part of the initial attribute data; and
(iii) communicate the initial session passport to the destination knowledgebase;
(d) apply at least part of the initial session passport to a second session at the destination knowledgebase to determine a second set of possible solutions;
(e) provide the first set of possible solutions and the second set of possible solutions to the user computing device; and
a communication network operatively coupled to the at least one server for communicating with at least one of the user computing device, the originating knowledgebase, and the destination knowledgebase,
wherein the originating knowledgebase and the destination knowledgebase are maintained independently, and
wherein the user computing device is configured to present to the user the at least one possible solution of the first set of possible solutions and the second set of possible solutions.

2. The system of claim 1, wherein the federation manager being configured to apply at least part of the initial session passport to a second session at the destination knowledgebase to determine a second set of possible solutions comprises the federation manager being configured to translate a term or structure of the initial attribute data to a corresponding term or structure of the destination knowledgebase.

3. The system of claim 1, wherein the federation manager being configured to generate an initial session passport comprises the federation manager being configured to:
(a) identify sensitive information in the initial attribute data; and
(b) remove the sensitive information to provide the at least part of the initial attribute data.

4. The system of claim 1, wherein the federation manager being configured to apply at least part of the initial session passport to a second session at the destination knowledgebase further comprises the federation manager being configured to import the first session information data into the second session at the destination knowledgebase.

5. The system of claim 1, wherein the federation manager being configured to apply at least part of the initial session passport to a second session at the destination knowledgebase to determine a second set of possible solutions further comprises the federation manager being configured to:
(a) suspend the first session at the originating knowledgebase; and
(b) upon receipt of the second set of possible solutions from the destination knowledgebase, resume the first session at the originating knowledgebase.

6. The system of claim 5, wherein the federation manager being configured to communicate the passport to the second destination knowledgebase further comprises the federation manager being configured to receive a modified session passport from the destination knowledgebase, the modified session passport comprising the second set of possible solutions.

7. The system of claim 6, wherein:
(a) the second session at the destination knowledgebase generates second session information data; and
(b) the modified session passport further comprises the second session information data.

8. The system of claim 7, wherein the federation manager being configured to resume the first session at the originating knowledgebase further comprises the federation manager being configured to import the second session information data into the first session at the origination knowledgebase.

9. The system of claim 1, wherein the federation manager being configured to communicate the initial session passport to the destination knowledgebase comprises the federation manager being configured to transmit the initial session passport in accordance with a passport protocol of the destination knowledgebase.

10. The system of claim 1, wherein the originating knowledgebase is configured to operate in a regular session mode and the destination knowledgebase is configured to operate in a subcomponent session mode.

11. The system of claim 1, wherein the second set of possible solutions is an empty set.

12. The system of claim 11, wherein:
the federation manager is further configured to:
(a) identify a second destination knowledgebase comprising a third case-based reasoning engine and a third knowledge database operatively coupled to the third case-based reasoning engine, the third knowledge database storing a third set of knowledge data; and
(b) apply at least part of the initial session passport to a third session at the second destination knowledgebase to determine a third set of possible solutions; and
the processor being operable to provide the first set of possible solutions and the second set of possible solutions to the user computing device further comprises the processor being operable to provide the third set of possible solutions to the user computing device.

13. The system of claim 1, wherein the first knowledgebase is configured to address queries of a regular attribute and a border attribute, the border attribute being associated with attributes of the second knowledgebase.

14. The system of claim 1, wherein the federation manager is further configured to, prior to applying at least part of the initial session passport to a second session at the destination knowledgebase to determine a second set of possible solutions, prompt the user to confirm the application of at least part of the initial session passport to a second session at the destination knowledgebase to determine a second set of possible solutions.

15. The system of claim 1, wherein the federation manager is further configured to, prior to applying the initial attribute data to a first session at an originating knowledgebase to determine a first set of possible solutions, search a plurality of connected knowledgebases determine which of the plurality of knowledgebases should be the originating knowledgebase.

16. A method for troubleshooting equipment problems, the method comprising:
(a) providing at least one server comprising a processor and a computer-readable storage medium coupled to the processor, the computer-readable storage medium comprising program code executable by the processor;
(b) coupling the at least one server to a communication network for communicating with at least one of a user computing device, an originating knowledgebase, and a destination knowledgebase;

(c) receiving initial attribute data from a user at the user computing device;

(d) providing the initial attribute data to the at least one server via the communication network;

(e) applying the initial attribute data to a first session at the originating knowledgebase to determine a first set of possible solutions, the originating knowledgebase comprising a first case-based reasoning engine and a first knowledge database operatively coupled to the first case-based reasoning engine, the first knowledge database storing a first set of knowledge data pertaining to a first equipment, the first session generating first session information data;

(f) identifying the destination knowledgebase comprising a second case-based reasoning engine and a second knowledge database operatively coupled to the second case-based reasoning engine, the second knowledge database storing a second set of knowledge data pertaining to a second equipment that is a component of the first equipment;

(g) generating an initial session passport comprising the first session information and at least part of the initial attribute data;

(h) communicating the initial session passport to the destination knowledgebase;

(i) applying at least part of the initial session passport to a second session at the destination knowledgebase to determine a second set of possible solutions;

(j) providing the first set of possible solutions and the second set of possible solutions to the user computing device, and (k) presenting at least one possible solution of the first set of possible solutions and the second set of possible solutions to the user at the user computing device, (l) wherein the originating knowledgebase and the destination knowledgebase are maintained independently.

17. The method of claim 16, wherein applying at least part of the initial session passport to a second session at the destination knowledgebase to determine a second set of possible solutions comprises translating a term or structure of the at least part of the initial attribute data to a corresponding term or structure of the destination knowledgebase.

18. The method of claim 16, generating an initial session passport based on the destination knowledgebase comprises:
(a) identifying sensitive information in the initial attribute data; and
(b) removing the sensitive information to provide the at least part of the initial 10 attribute data.

19. The method of claim 16, wherein applying at least part of the initial session passport to a second session at the destination knowledgebase further comprises importing the first session information data into the second session at the destination knowledgebase.

20. The method of claim 16, wherein applying the at least part of the initial session passport to a second session at the destination knowledgebase to determine a second set of possible solutions further comprises:
(a) suspending the first session at the originating knowledgebase; and (b) upon receipt of the second set of possible solutions from the destination knowledgebase, resuming the first session at the originating knowledgebase.

21. The method of claim 20, wherein communicating the passport to the destination knowledgebase further comprises receiving a modified session passport from the destination knowledgebase, the modified session passport comprising the second set of possible solutions.

22. The method of claim 21, wherein:
(a) the second session at the destination knowledgebase generates second session information data; and
(b) the modified session passport further comprises the second session information data.

23. The method of claim 22, wherein resuming the first session at the originating knowledgebase further comprises importing the second session information data into the first session at the origination knowledgebase.

24. The method of claim 16, wherein communicating the initial session passport to the destination knowledgebase comprises transmitting the initial session passport in accordance with a passport protocol of the destination knowledgebase.

25. The method of claim 16, wherein the originating knowledgebase is configured to operate in a regular session mode and the destination knowledgebase is configured to operate in a subcomponent session mode.

26. The method of claim 16, wherein the second set of possible solutions is an empty set.

27. The method of claim 26, further comprising:
(a) identifying a second destination knowledgebase comprising a third case-based reasoning engine and a third knowledge database operatively coupled to the third case-based reasoning engine, the third knowledge database storing a third set of knowledge data; and
(b) applying at least part of the initial session passport to a third session at the second destination knowledgebase to determine a third set of possible solutions; and
wherein providing the first set of possible solutions and the second set of possible solutions to the user computing device further comprises providing the third set of possible solutions to the user computing device.

28. The method of claim 16, wherein the first knowledgebase is configured to address queries of a regular attribute and a border attribute, the border attribute being associated with attributes of the second knowledgebase.

29. The method of claim 16, further comprising, prior to applying at least part of the initial session passport to a second session at the destination knowledgebase to determine a second set of possible solutions, prompting the user to confirm the application of the at least part of the initial session passport to a second session at the destination knowledgebase to determine a second set of possible solutions.

30. The method of claim 16, further comprising, prior to applying the originating attribute data to a first session at an originating knowledgebase to determine a first set of possible solutions, searching a plurality of connected knowledgebases determine which of the plurality of knowledgebases should be the originating knowledgebase.

* * * * *